(12) United States Patent
Bell

(10) Patent No.: US 8,814,474 B2
(45) Date of Patent: Aug. 26, 2014

(54) LOW DEFLECTION DRAINAGE TILE PLOW

(75) Inventor: Dennis E. Bell, Terre Haute, IN (US)

(73) Assignee: Soil-Max, Inc., Terre Haute, IN (US)

( * ) Notice: Subject to any disclaimer, the term of this patent is extended or adjusted under 35 U.S.C. 154(b) by 28 days.

(21) Appl. No.: 13/356,064

(22) Filed: Jan. 23, 2012

(65) Prior Publication Data

US 2012/0195688 A1 Aug. 2, 2012

Related U.S. Application Data

(60) Provisional application No. 61/438,444, filed on Feb. 1, 2011.

(51) Int. Cl.
*F16L 1/028* (2006.01)
*E02F 5/10* (2006.01)
*F16L 1/032* (2006.01)

(52) U.S. Cl.
CPC .............. *E02F 5/101* (2013.01); *F16L 1/032* (2013.01); *E02F 5/102* (2013.01)
USPC .......................................... 405/181; 405/183

(58) Field of Classification Search
USPC ........................... 405/174, 180, 181, 182, 183
See application file for complete search history.

(56) References Cited

U.S. PATENT DOCUMENTS

| 3,515,222 | A | * | 6/1970 | Kant | 405/181 |
|---|---|---|---|---|---|
| 4,014,175 | A | * | 3/1977 | Brink | 405/183 |
| 4,040,261 | A | * | 8/1977 | Schuck et al. | 405/182 |
| 4,079,593 | A | * | 3/1978 | Flippin | 405/182 |
| 4,119,157 | A | * | 10/1978 | Schuck et al. | 405/181 |
| 4,397,585 | A | * | 8/1983 | Fouss et al. | 405/183 |
| 4,892,443 | A | * | 1/1990 | Kunze et al. | 405/164 |
| 6,299,381 | B1 | * | 10/2001 | Liebrecht, Jr. | 405/181 |
| 8,090,507 | B2 | | 1/2012 | Yegerlehner et al. | |

* cited by examiner

*Primary Examiner* — Frederick L Lagman

(74) *Attorney, Agent, or Firm* — McKee, Voorhees & Sease

(57) ABSTRACT

A pitch plow and method of laying flexible pipe in ground includes drawing a pitch plow with respect to the ground, the pitch plow having a frame and a shank pivotally mounted to a frame at a pivot, said shank defining a cutting edge. The shank is oriented relative to earth horizontal causing a change in the elevation of the cutting edge. Flexible pipe is fed through a boot extending generally along the shank. The flexible pipe is fed at an in-feed at an upper portion of the boot and discharged at a discharge at a lower portion thereof. The discharge is generally aligned with a vertical axis passing through the pivot in order to minimize vertical movement of the discharge as the shank pivots about the pivot.

32 Claims, 4 Drawing Sheets

LOW DEFLECTION DRAINAGE TILE PLOW

CROSS-REFERENCE TO RELATED APPLICATION

This application claims priority from U.S. provisional patent application Ser. No. 61/438,444, filed on Feb. 1, 2011, the disclosure of which is hereby incorporated herein by reference in its entirety.

BACKGROUND OF THE INVENTION

The present invention relates to a pitch plow and method of laying a flexible pipe. The invention is illustrated as an agricultural drainage tile plow used to install underground flexible pipe, which is often referred to as drainage tile. However, the invention could be applied to a range of applications, including installation of underground electrical cable, fiber optic cable, or other forms of flexible pipe.

Drainage tile plows, which include pitch plows, are most typically employed by farmers for installing underground flexible pipe as a water management strategy to improve yield, drought resistance, and timeliness of access to their fields. A pitch plow is pulled behind a tractor. As the tractor pulls the plow through the ground, the plow temporarily creates a trench into which the flexible pipe is installed. The foremost tip of the plow's implement cuts a subsurface on which flexible pipe is laid. Favorable drainage characteristics depend upon good control of the installed pipe profile's depth and grade, which is typically at a slope.

SUMMARY OF THE INVENTION

The present invention provides a pitch plow and method of laying flexible pipe that does not crush the pipe even during abrupt changes to orientation of the shank. A pitch plow and method of laying flexible pipe in the ground, according to an aspect of the invention, includes drawing a pitch plow with respect to the ground, the pitch plow having a frame and a shank pivotally mounted to frame at a pivot, said shank defining a cutting edge. The shank is oriented relative to earth horizontal causing a change in the elevation of the cutting edge. A flexible pipe is fed through a boot extending generally along the shank. The flexible pipe is fed at an in-feed at an upper portion of the boot and discharged at a discharge at a lower portion thereof. The discharge is generally aligned with a vertical axis passing through the pivot in order to minimize vertical movement of the discharge as the shank pivots about the pivot.

The boot may traverse the vertical axis passing through the pivot. The boot may include a generally straight central portion and a curved portion between the central portion and the discharge. The straight portion intersects with the vertical axis. The curved portion may define an arc that is greater than 90 degrees.

The orientation of the shank may be controlled relative to earth horizontal in order to control elevation of the cutting edge. Orientation of the shank may be controlled by a manual control and/or an automatic control. The discharge may be moved in a horizontal range of between approximately three inches (3") on one side of the vertical axis and approximately three inches (3") on the other side of the vertical axis.

These and other objects, advantages and features of this invention will become apparent upon review of the following specification in conjunction with the drawings.

DESCRIPTION OF THE PREFERRED EMBODIMENT

Figure 1:
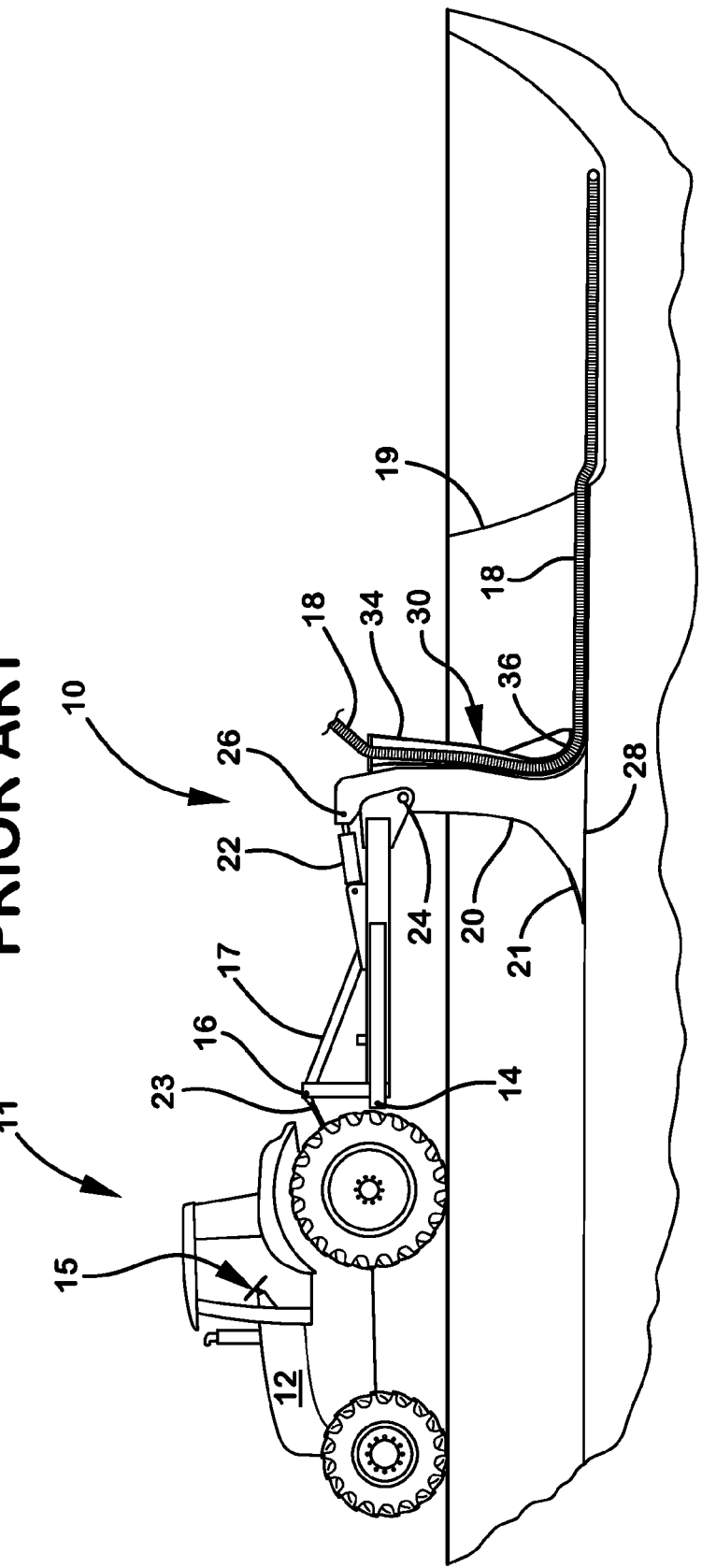
FIG. 1 is a side elevation of a prior art pitch plow being drawn by a tractor.
Figure 2:
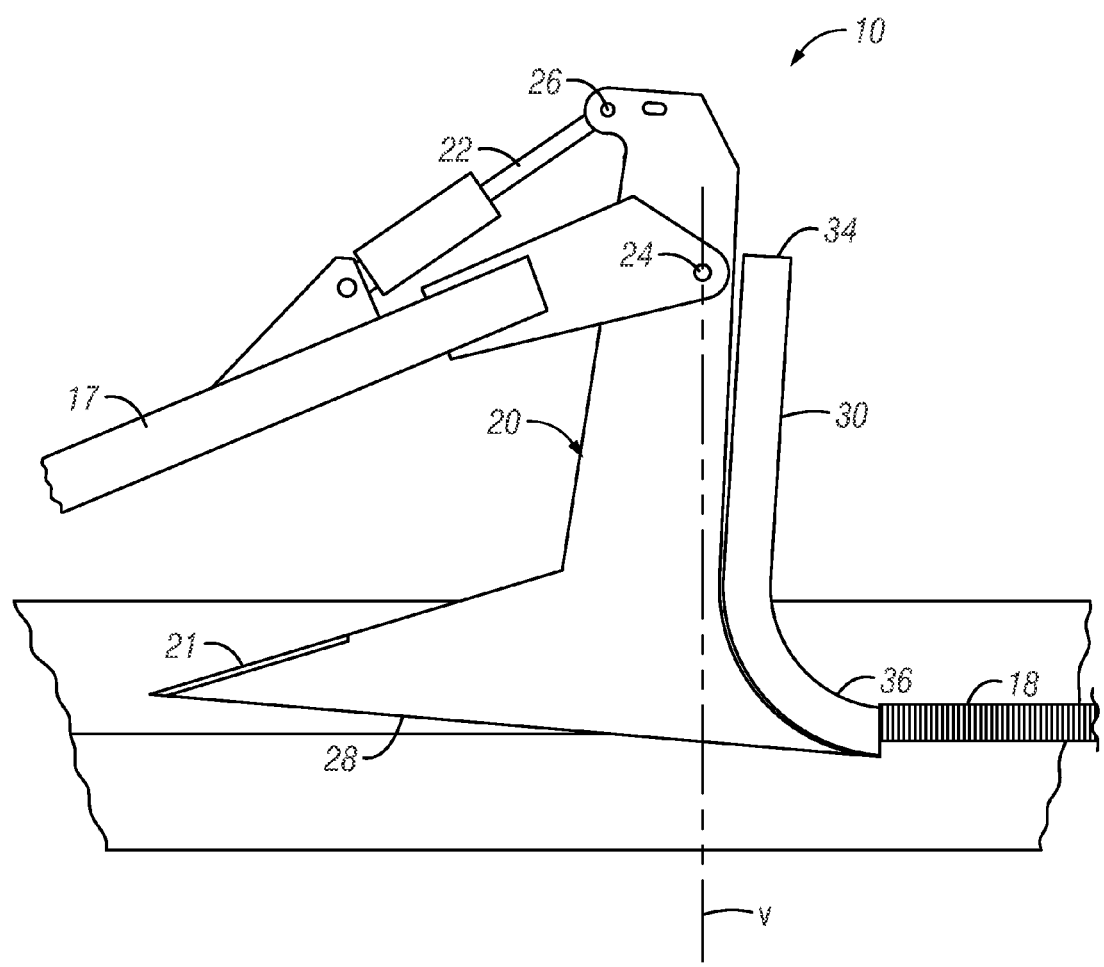
FIG. 2 is an enlarged side elevation of the pitch plow in FIG. 1.
Figure 3:
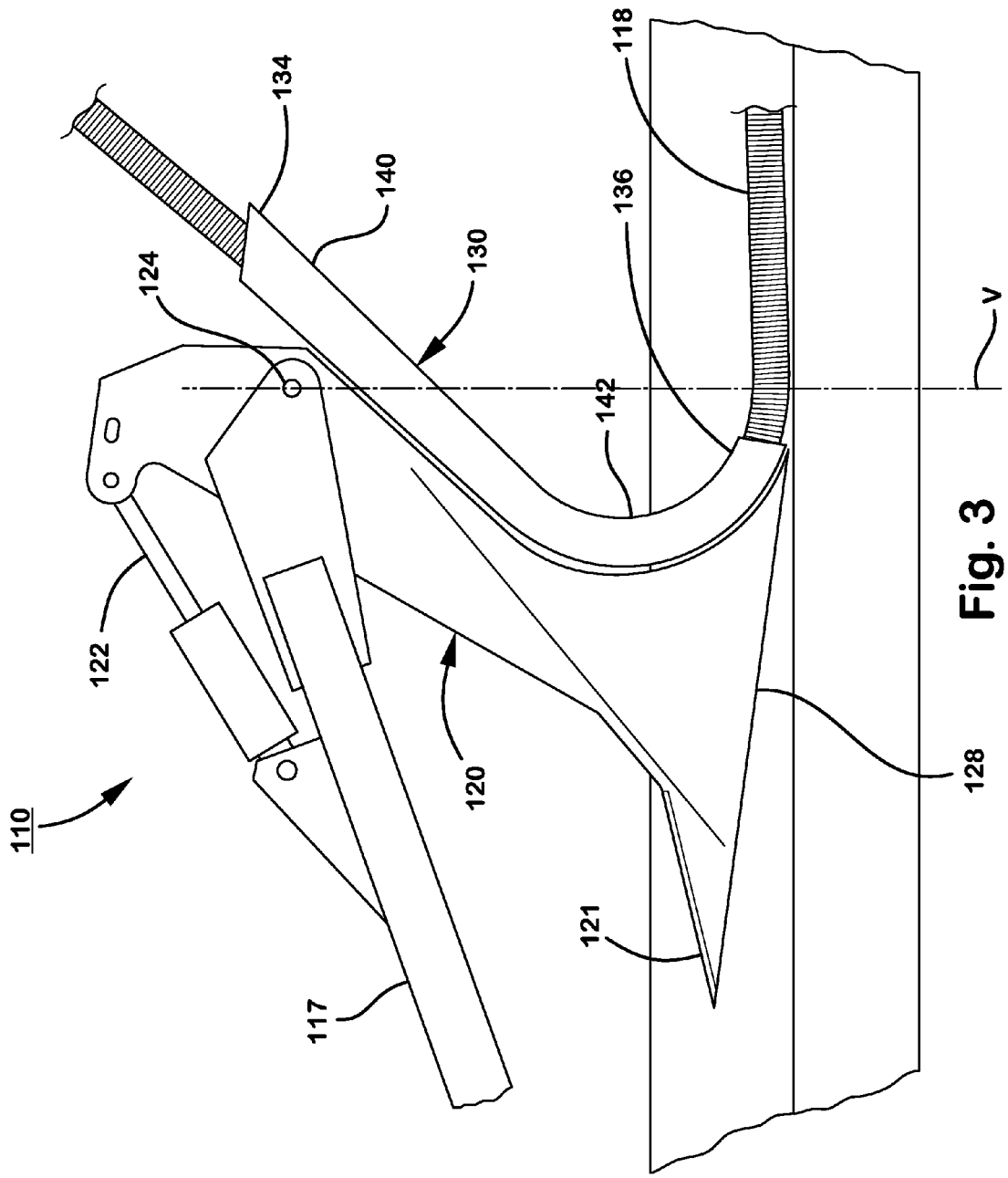
FIG. 3 is a side elevation of a pitch plow according to an embodiment of the present invention.
Figure 4:
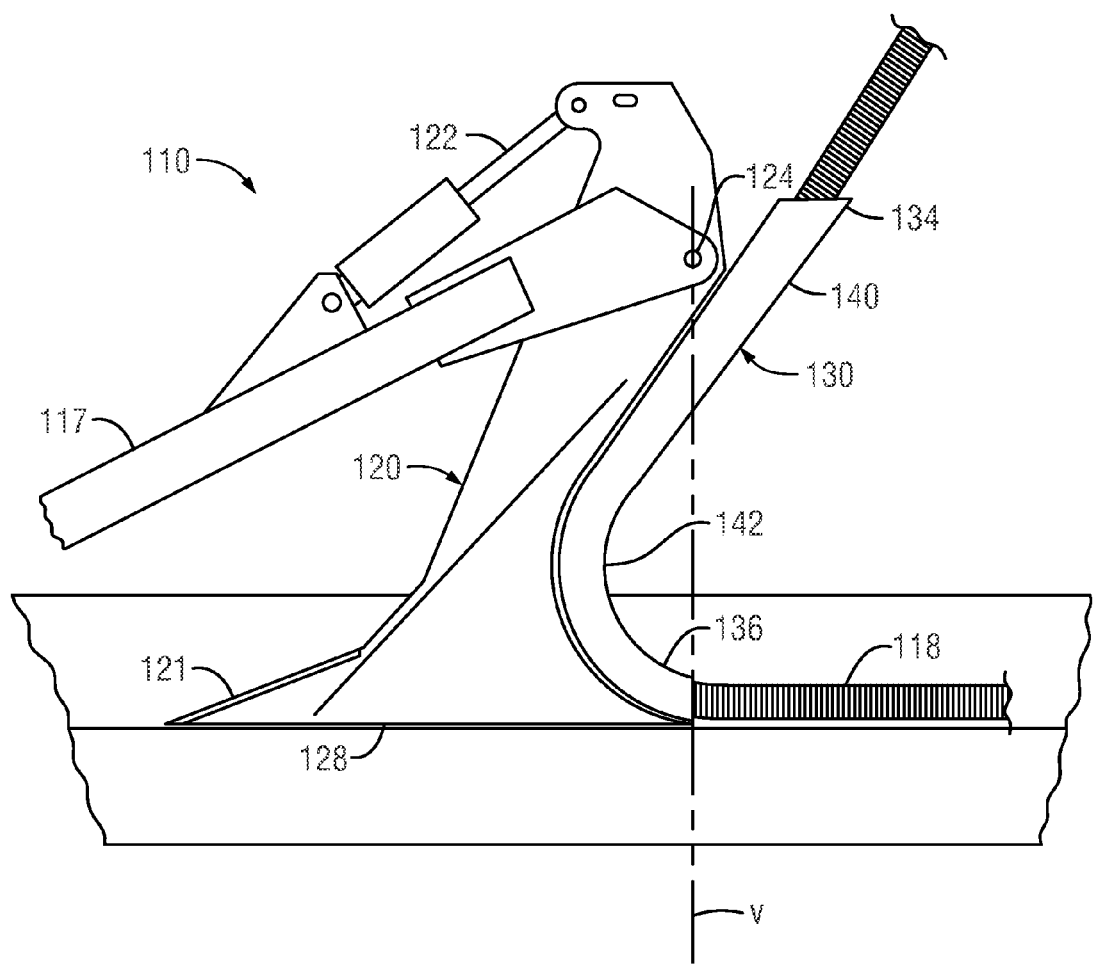
FIG. 4 illustrates the pitch plow of FIG. 3 pivoted such that the skid is parallel with the horizontal.

Referring now to the drawings, and the illustrative embodiments depicted therein, a conventional, or prior art, pitch plow, such as drainage plow 10, includes a frame 17 and a shank 20 that is pivotally mounted to the frame (FIGS. 1 and 2). The shank defines a forward cutting edge, or shear 21. A hydraulic control, or actuator, 22 between shank 20 and frame 17 is adapted to pivotally adjust shank 20 with respect to frame 17. Hydraulic actuator 22 may be operated manually by an operator via a control lever (not shown) or automatically via an electronic control (not shown).

A prime mover, such as a tractor 11, propels plow 10. Control of the propulsion and steering of the tractor 11 and its 3-point hitch (not shown) is through a main user interface of the tractor as is conventional. Frame 17 of plow 10 may be coupled to tractor 11 by pins 14 through holes of outer arms (not shown) and a pin 16 through the hole of an upper arm 23 of a conventional 3-point hitch of tractor 11 as is the practice. Alternatively, frame 17 may be coupled to tractor 11 by a drawbar hitch or other known connection techniques. Shank 20 is pivotally attached to frame 17 by a pin 24. Hydraulic actuator 22 extends and retracts, transmitting force through a pin 26 causing shank 20 to pivot about pin 24. A skid plate 28 is welded to the bottom of shank 20. The shear 21 is mounted to shank 20 and its tip functions as the plow's cutting edge. A boot 30 of shank 20 provides a channel through which flexible pipe 18 passes as it is installed by the plow. An in-feed 34 to boot 30 receives the flexible pipe, and a discharge 36 lays the flexible pipe in the trench.

To install flexible pipe, the tractor 11 is maneuvered such that it points in the direction in which pipe is to be installed, and the plow 10 is positioned over a trench or ditch 19, as is depicted in FIG. 1. The plow 10 is lowered into the trench 19 using the hydraulically actuated 3-point hitch. An operator feeds flexible pipe or conduit 18 by hand into the in-feed 34 of boot 30 until the flexible pipe comes out of the discharge 36 at the bottom of the boot and lies upon the bottom of trench 19. The pipe is anchored in place along the bottom, such as by placing weighty soil upon it or by standing on it. The tractor 11 drives forward exerting force on the plow 10 via the pins 14 and 16, thus drawing the plow forward. As the plow 10 is drawn forward, shear 21 displaces soil and thereby cuts a subsurface upon which the flexible pipe 18 is laid. Shank 20 displaces soil temporarily opening a trench through which said shank passes. The weight of soil upon and around the installed flexible pipe 18 holds the pipe in place causing flexible pipe 18 to continuously be drawn through the boot 30 as plow 10 progresses forward.

When the draft control is on, shank 20 pivots about 24 to control the angle of skid plate 28 which causes cutting edge 21 to increase or decrease in elevation as tractor 11 pulls plow 10 forward. In conventional pitch plow 10, discharge 36 is located significantly horizontally behind the vertical axis "V" passing through pivot pin 24. In this manner, as shank 20 pivots about pivot pin 24, discharge 36 moves vertically. If, for example, skid plate 28 and cutting edge 21 pitch a significant amount upwardly, discharge 36 moves downwardly thereby crushing pipe 18.

A pitch plow 110, according to an embodiment of the present invention, includes a frame 117 and a shank 120 pivotally mounted to frame 117 at a pivot 124. Shank 120 defines a cutting edge 121. In this manner, the orientation of shank 120 is relative to earth causing a change in the elevation of cutting edge 121. A boot 130 extends generally along shank 120 for feeding flexible pipe 118 into the ditch formed by pitch plow 110. Boot 130 has an in-feed 134 at an upper portion thereof and a discharge 136 at a lower portion thereof. Discharge 136 is generally aligned with a vertical axis "V" passing through pivot 124. This placement of discharge 136 minimizes vertical movement of discharge 136 as shank 120 pivots about pivot 124.

In the illustrated embodiment, boot 130 includes a generally straight central portion 140 and a curved portion 142 between central portion 140 and discharge 136. Curved portion 142 is provided in order to provide a smooth transition between central portion 140 and horizontal. Straight portion 140 traverses vertical axis "V". Curved portion 142 defines an arc that is greater than 90 degrees.

Pitch plow 110 includes an actuator 122, such as a hydraulic actuator, between shank 120 and frame 117. Actuator 122 causes shank 120 to pivot about frame 117. Actuator 122 is operated by a manual control (not shown) and/or an automatic control (not shown). Actuator 122 causes discharge 136 to move in a horizontal range as the actuator moves shank 120 relative to frame 117 to control the pitch of skid plate 128 and thereby the elevation of cutting edge 121. The range is between approximately three inches (3") on one side of vertical axis V and approximately three inches (3") on the other side of vertical axis V. This results in a minimum elevation change of discharge 136, Therefore, even if actuator 122 makes an abrupt change to the orientation of shank 120, discharge 136 will not crush pipe 118.

In operation, a tractor (not shown) draws pitch plow 110 with respect to the ground. Orienting of shank 120 relative to earth horizontal is adjusted causing a change in elevation of cutting edge 121. Flexible pipe 118 is fed through boot 130 extending generally along shank 120 with the flexible pipe fed at in-feed 134 at an upper portion of the boot and discharged at discharge 136 at a lower portion of the boot. With discharge 136 generally aligned with vertical axis V passing through pivot 124, vertical movement of discharge 136 will be minimized as shank 120 pivots about pivot 124.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A pitch plow, comprising:
   a frame;
   a shank pivotally mounted to said frame at a pitch pivot, said shank defining a cutting edge, wherein an orientation of said shank relative to earth causing a change in the elevation of said cutting edge such that depth of the pitch plow is controlled by pitch with rotation in a first direction at the pitch pivot increasing depth of the pitch plow and rotation in a second direction opposite of the first direction at the pitch pivot decreasing depth of the pitch plow; and
   a boot extending generally along said shank, said boot having an in-feed at an upper portion thereof and a discharge at a lower portion thereof, wherein said boot includes a generally straight central portion extending downwardly and forwardly and a curve portion between said straight central portion and said discharge, wherein the curved portion extends downwardly and rearwardly from the generally straight central portion;
   wherein in a depth decreasing position, said discharge is positioned such that a vertical axis, said vertical axis perpendicular with earth horizontal, passing through said pitch pivot and said generally straight central portion of the boot is rearward of the discharge when the shank is pivoted to decrease depth of the pitch plow;
   wherein in a depth increasing position, said discharge is positioned such that the vertical axis passing through said pitch pivot and said generally straight central portion of the boot is forward of the discharge when the shank is pivoted to increase depth of the pitch plow.

2. The pitch plow as claimed in claim 1, wherein said curved portion defines an arc that is greater than or equal to 90 degrees.

3. The pitch plow as claimed in claim 1 wherein said boot defines an arc that is greater than or equal to 90 degrees.

4. The pitch plow as claimed in claim 1 including an actuator between said shank and said frame.

5. The pitch plow as claimed in claim 4 wherein said actuator is operated by at least one chosen from a manual control and an automatic control.

6. The pitch plow of claim 1 wherein said discharge moves no more than approximately 3 inches on one side of the vertical axis and no more than approximately 3 inches on the other side of the vertical axis while maintaining grade.

7. The pitch plow of claim 1 wherein said boot defines an arc that is greater than or equal to 90 degrees.

8. The pitch plow of claim 1 wherein drainage conduit moving from the in-feed to the discharge experiences a change in direction of 90 degrees or more.

9. A pitch plow, comprising:
   a frame;
   a shank pivotally mounted to said frame at a pitch pivot, said shank defining a cutting edge, wherein an orientation of said shank relative to earth causing a change in the elevation of said cutting edge; and
   a boot extending generally along said shank, said boot having an in-feed at an upper portion thereof and a discharge at a lower portion thereof, wherein said discharge is generally aligned with a vertical axis passing through said pitch pivot in order to minimize vertical movement of said discharge as said shank pivots about said pitch pivot; and
   wherein said boot defines an arc that is greater than or equal to 90 degrees;
   wherein said discharge moves in a horizontal range of between no more than approximately 3 inches on one side of the vertical axis and no more than approximately 3 inches on the other side of the vertical axis while maintaining grade.

10. A pitch plow, comprising:
    a frame;
    a shank pivotally mounted to said frame at a pitch pivot, said shank defining a cutting edge, wherein an orientation of said shank relative to earth causing a change in the elevation of said cutting edge; and a boot extending generally along said shank, said boot having an in-feed at an upper portion thereof and a discharge at a lower portion thereof, wherein said discharge is generally aligned with a vertical axis passing through said pitch pivot in order to minimize vertical movement of said discharge as said shank pivots about said pitch pivot; and wherein said discharge moves in a horizontal range of between no more than approximately 3 inches on one side of the vertical axis and no more than approximately 3 inches on the other side of the vertical axis while maintaining grade.

11. A method of laying flexible pipe in ground, comprising:
drawing a pitch plow with respect to the ground, the pitch plow comprising (a) a frame;
(b) a shank pivotally mounted to said frame at a pitch pivot, said shank defining a cutting edge, wherein an orientation of said shank relative to earth causing a change in the elevation of the cutting edge such that depth of the pitch plow is controlled by pitch with rotation in a first direction at the pitch pivot increasing depth of the pitch plow and rotation in a second direction opposite of the first direction at the pitch pivot decresing depth of the pitch plow; (c) a boot extending generally along the shank, the boot having an in-feed at an upper portion thereof and a discharge at a lower portion thereof, wherein said boot includes a generally straight central portion extending downwardly and forwardly and a curved potion between said straight central portion and said discharge, wherein the curved portion extends downwardly and rearwardly from the generally straight central portion; (d) an actuator between the shank and the frame, the actuator causing the shank to pivot about the frame: (e) wherein in a depth decreasing position, said discharge is positioned such that a vertical axis, said vertical axis perpendicular with earth horizontal, passing through said pitch pivot and said generally straight central portion of the boot is rearward of the discharge when the shank is pivoted to decrease depth of the pitch plow; (f) wherein in a depth increasing position, said discharge is positioned such that the vertical axis passing through said pitch pivot and said generally straight central portion of the boot is forward of the discharge when the shank is pivoted to increase depth of the pitch plow;
orienting said shank relative to earth horizontal causing a change in the elevation of said cutting edge; and
feeding flexible pipe through a boot extending generally along said shank, including feeding the flexible pipe at an in-feed at an upper portion of the boot and discharging the flexible pipe at a discharge at a lower portion thereof, including generally aligning the discharge with a vertical axis passing through said pitch pivot n order to minimize vertical movement of said discharge as said shank pivots about said pitch pivot.

12. The method as claimed in claim 11 wherein said curved portion defines an arc that is greater than or equal to 90 degrees.

13. The method as claimed in claim 11 wherein said boot defines an arc that is greater than or equal to 90 degrees.

14. The method as claimed in claim 11 including controlling orientation of said shank relative to earth horizontal in order to control the elevation of said cutting edge.

15. The method as claimed in claim 14 including controlling orientation of said shank by at least one chosen from manual control and automatic control.

16. A method of laying flexible pipe in ground, comprising:
drawing a pitch plow with respect to the ground, the pitch plow having a frame and a shank pivotally mounted to said frame at a pitch pivot, said shank dermining a cutting edge;
orienting said shank relative to earth horizontal causing a change in the elevation of said cutting edge; and
feeding flexible pies through a boot extending generally along said shank, including feeding the flexible pipe at an in-feed at an upper portion of the boot and discharging the flexible pipe at a discharge at a lower portion thereof, including generally aligning the discharge with a vertical axis passing through said pitch pivot in order to minimize vertical movement of said discharge as said shank pivots about said pitch pivot; and
including moving said discharge in a horizontal range of between no more than approximately 3 inches on one side of the vertical axis and no more than approximately 3 inches on the other side of the vertical axis while maintaining grade;
wherein said boot defines an arc that is greater than or equal to 90 degrees.

17. A method of laying flexible pipe in ground, comprising:
drawing a pitch plow with respect to the ground, the pitch plow having a frame and a shank pivotally mounted to said frame at a pitch pivot, said shank defining a cutting edge;
orienting said shank relative to earth horizontal causing a change in the elevation of said cutting edge; and
feeding flexible pipe through a boot extending generally along said shank, including feeding the flexible pipe at an in-feed at an upper portion of the boot and discharging the flexible pipe at a discharge at a lower portion thereof, including generally aligning the discharge with a vertical axis through said pitch pivot in order to minimize vertical movement of said discharge as said shank pivots about said pitch pivot, including moving said discharge in a horizontal range of between no more than approximately 3 inches on one side of the vertical axis and no more than approximately 3 inches on the other side of the vertical axis while maintaining grade.

18. A pitch plow, comprising:
a frame;
a shank pivotally mounted to said frame at a pitch pivot, said shank defining a cutting edge, wherein an orientation of said shank relative to earth causing a change in the elevation of the cutting edge;
a boot extending generally along the shank, the boot having an in-feed at an upper portion thereof and a discharge at a lower portion thereof;
an actuator between the shank and the frame, the actuator causing the shank to pivot about the frame causing the cutting edge to increase in elevation to a depth decreasing position or decrease in elevation to a depth increasing position; and
a skid plate on the shank;
wherein when the skid plate on the shank is perpendicular to a vertical axis passing through the pivot, the discharge is aligned with the vertical axis to thereby minimize vertical movement of said discharge as said shank pivots about said pitch pivot.

19. The pitch plow of claim 18 wherein said boot includes a generally straight central portion extending downwardly and forwardly and a curved portion between said straight central portion and said discharge, wherein the curved portion extends downwardly and rearwardly from the generally straight central portion.

20. The pitch plow of claim 19 wherein in the depth decreasing position, said discharge is positioned such that a vertical axis, said vertical axis perpendicular with earth horizontal, passing through said pitch pivot and said generally straight central portion of the boot is rearward of the discharge when the shank is pivoted to decrease depth of the pitch plow.

21. The pitch plow of claim 20 wherein in the depth increasing position, said discharge is positioned such that the vertical axis passing through said pitch pivot and said generally straight central portion of the boot is forward of the discharge when the shank is pivoted to increase depth of the pitch plow.

22. The pitch plow of claim 19 wherein in the depth increasing position, said discharge is positioned such that the vertical axis passing through said pitch pivot and said generally straight central portion of the boot is forward of the discharge when the shank is pivoted to increase depth of the pitch plow.

23. The pitch plow of claim 18 wherein said discharge moves no more than approximately 3 inches on one side of the vertical axis and no more than approximately 3 inches on the other side of the vertical axis while maintaining grade.

24. The pitch plow of claim 18 wherein said boot defines an arc that is greater than or equal to 90 degrees.

25. The pitch plow of claim 18 wherein drainage conduit moving from the in-feed to the discharge experiences a change in direction of 90 degrees or more.

26. A pitch plow, comprising:
   a frame;
   a shank pivotally mounted to said frame at a pitch pivot, said shank defining a cutting edge, wherein an orientation of said shank relative to earth causing a change in the elevation of the cutting edge such that depth of the pitch plow is controlled by pitch with rotation in a first direction at the pitch pivot increasing depth of the pitch plow and rotation in a second direction opposite of the first direction at the pitch pivot decreasing depth of the pitch plow;
   a boot extending generally along the shank, the boot having an in-feed at an upper portion thereof and a discharge at a lower portion thereof, wherein said boot includes a generally straight central portion extending downwardly and forwardly and a curved portion between said straight central portion and said discharge, wherein the curved portion extends downwardly and rearwardly from the generally straight central portion;
   an actuator between the shank and the frame, the actuator causing the shank to pivot about the frame;
   wherein in a depth decreasing position, said discharge is positioned such that a vertical axis, said vertical axis perpendicular with earth horizontal, passing through said pitch pivot and said generally straight central portion of the hoot is rearward of the discharge when the shank is pivoted to decrease depth of the pitch plow;
   wherein in a depth increasing position, said discharge is positioned such that the vertical axis passing through said pitch pivot and said generally straight central portion of the boot is forward of the discharge when the shank is pivoted to increase depth of the pitch plow.

27. The pitch plow of claim 26 wherein said actuator is operated by at least one chosen from a manual control and an automatic control.

28. The pitch plow of claim 26 wherein said discharge moves no more than approximately 3 inches on one side of the vertical axis and no more than approximately 3 inches on the other side of the v ical axis while maintaining grade.

29. The pitch plow of claim 26 wherein said boot defines an arc that is greater than or equal to 90 degrees.

30. The pitch plow of claim 26 wherein drainage conduit moving from the in-feed to the discharge experiences a change in direction of 90 degrees or more.

31. An agricultural pitch plow for installing underground flexible pipe, comprising:
   a frame;
   a shank pivotally mounted to said frame at a pitch pivot, said shank defining a cutting edge, wherein an orientation of said shank relative to earth causing a change in the elevation of the cutting edge such that depth of the agricultural pitch plow is controlled by pitch with rotation in a first direction at the pitch pivot increasing depth of the agricultural pitch plow and rotation in a second direction opposite of the first direction at the pitch pivot decreasing depth of the agricultural pitch plow;
   a boot extending generally along the shank, the boot having an in-feed at an upper portion thereof and a discharge at a lower portion thereof;
   an actuator between the shank and the frame, the actuator causing the shank to pivot about the frame;
   wherein said boot defines a path for the flexible pipe traveling therethrough from the in-feed to the discharge such that the flexible pipe experiences a change in direction of 90 degrees or more through the boot;
   wherein said discharge moves in a horizontal range of between no more than approximately 3 inches on one side of a vertical axis and no more than approximately 3 inches on an opposite side of the vertical axis while maintaining grade.

32. A method of laying flexible pipe in ground, comprising:
   drawing a pitch plow with respect to the ground, the pitch plow comprising (a) a frame; (b) a shank pivotally mounted to said frame at a pitch pivot, said shank defining a cutting edge, wherein an orientation of said shank relative to earth causing a change in the elevation of the cutting edge such that depth of the pitch plow is controlled by pitch with rotation in a first direction at the pitch pivot increasing depth of the pitch plow and rotation in a second direction opposite of the first direction at the pitch pivot decreasing depth of the pitch plow; (c) a boot extending generally along the shank, the boot having an in-feed at an upper portion thereof and a discharge at a lower portion thereof orienting said shank relative to earth horizontal causing a change in the elevation of said cutting edge, wherein said boot includes a generally straight central portion extending downwardly and forwardly and a curved portion between said straight central portion and said discharge, wherein the curved portion extends downwardly and rearwardly from the generally straight central portion;
   feeding flexible pipe through a hoot extending generally along said shank, including feeding the flexible pipe at an in-feed at an upper portion of the boot and discharging the flexible pipe at a discharge at a lower portion thereof, including generally aligning the discharge with a vertical axis passing through said pitch pivot in order to minimize vertical movement of said discharge as said shank pivots about said pitch pivot; and
   pivoting the shank at the pitch pivot to a depth decreasing position such that the discharge is positioned such that a vertical axis perpendicular with earth horizontal passes through the pitch pivot and said generally straight central portion of the boot is rearward of the discharge in the depth decreasing position.

* * * * *

UNITED STATES PATENT AND TRADEMARK OFFICE
CERTIFICATE OF CORRECTION

| | | |
|---|---|---|
| PATENT NO. | : 8,814,474 B2 | Page 1 of 1 |
| APPLICATION NO. | : 13/356064 | |
| DATED | : August 26, 2014 | |
| INVENTOR(S) | : Dennis E Bell | |

It is certified that error appears in the above-identified patent and that said Letters Patent is hereby corrected as shown below:

In the Claims

Col. 5, Claim 11, Line 29:
DELETE after curved "potion"
ADD after curved --portion--

Col. 6, Claim 16, Line 4:
DELETE after shank "dermining"
ADD after shank --defining--

Col. 6, Claim 16, Line 8:
DELETE after flexible "pies"
ADD after flexible --pipe--

Col. 5, Claim 11, Line 52:
DELETE after pivot "n"
ADD after pivot --in--

Col. 7, Claim 26, Line 54:
DELETE after of the "hoot"
ADD after of the --boot--

Col. 7, Claim 28, Line 67:
DELETE after the "v ical axis"
ADD after the --vertical axis--

Col. 8, Claim 32, Line 53:
DELETE after through a "hoot"
ADD after through a --boot--

Signed and Sealed this
Twenty-third Day of December, 2014

Michelle K. Lee
*Deputy Director of the United States Patent and Trademark Office*